UNITED STATES PATENT OFFICE.

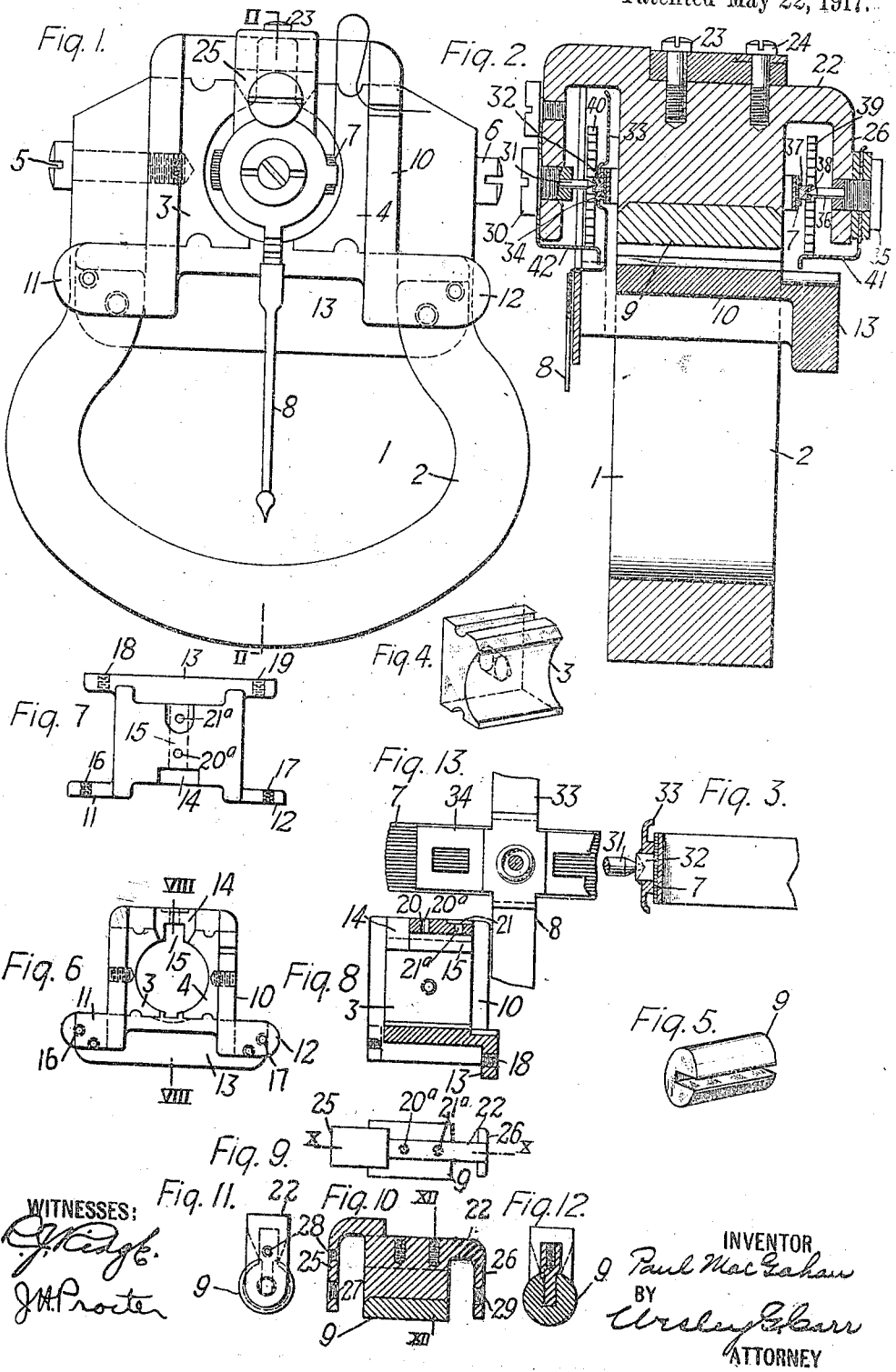

PAUL MacGAHAN, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL MEASURING INSTRUMENT.

1,227,468.	Specification of Letters Patent.	Patented May 22, 1917.

Application filed May 1, 1913. Serial No. 764,867.

*To all whom it may concern:*

Be it known that I, PAUL MacGAHAN, a citizen of the United States, and a resident of Pittsburgh, in the county of Allegheny and State of Pennsylvania, have invented a new and useful Improvement in Electrical Measuring Instruments, of which the following is a specification.

My invention relates to electrical measuring instruments and particularly to novel features of construction thereof.

The object of my invention is to provide an electrical measuring instrument with bearings and pole pieces which are simple and inexpensive to construct.

In electrical measuring instruments, the permanent magnet pole pieces are usually accurately machined and centered to receive the permanent magnet yoke and the core of the rotatable element. The cost of machining such pole pieces is high and requires a great amount of skill. The bearings of the rotatable armature element of electrical measuring instruments, as heretofore constructed, were usually also expensive to manufacture.

My invention is illustrated in the accompanying drawings in which Figure 1 is a plan view of the assembled instrument. Fig. 2 is a section on the line II—II of Fig. 1. Fig. 3 is a detail view of one of the bearings, partially in section. Fig. 4 is a perspective view of one of the pole pieces. Fig. 5 is a perspective view of the magnetic core of the instrument without its supporting member. Fig. 6 is a front elevation of the die-cast pole pieces and their housing. Fig. 7 is a top plan view of the parts shown in Fig. 6. Fig. 8 is a sectional view on the line VIII—VIII of Fig. 6. Fig. 9 is a view of the core and die-cast bearing supports. Fig. 10 is a sectional view on the line X—X of Fig. 9. Fig. 11 is a top plan view of the parts shown in Fig. 9. Fig. 12 is a sectional view on the line XII—XII of Fig. 10. Fig. 13 is a plan view of a portion of the rotatable element and the support for its pointer.

Referring to the drawings, the electrical measuring instrument 1 comprises a permanent magnet 2, field pole pieces 3 and 4 which are fastened to the frame by screws 5 and 6, a rotatable armature 7, a pointer 8 and a core 9 so disposed that when a current flows through the armature, the latter turns around the core 9 and, with the aid of the pointer 8, indicates the correct reading of the instrument on a scale (not shown).

Having described, in general, the operation of the instrument, a more explicit description of the novel features of my invention will be given. Rectangular bodies of steel (not shown) are drilled and provided with grooves for anchoring purposes and then are cut into two parts to form two pole pieces like the pole piece 3 shown in Fig. 4. Two such pole pieces are centered on a die and a housing or frame 10 of some alloy is cast around them, thus forming so called die-cast pole pieces. Each of the pole pieces has a hole tapped in its end to receive one of the holding screws 5 and 6. The novelty of this part of my invention is that, with the so-called die-cast pole pieces, accurate centering of the pieces may be had without machine work after casting, thereby simplifying and cheapening the cost of manufacturing.

The housing or die-cast frame 10 has feet 11 and 12 for supporting the instrument dial (not shown), and also a projection 13 for supporting the instrument mechanism from the case (not shown). The die-cast frame or housing 10 is provided with a slot 14 in its top at one end and with an inside recess 15 which extends the entire length of the housing and adjoins the opening left for the clearance between field pole pieces, as shown in Figs. 6, 7 and 8. The housing 10 is tapped for receiving screws at points 16, 17, 18, 19, 20 and 21, and the screw holes 20ª and 21ª are extended through the housing into a member 22 which is die-cast to the core 9 around which the armature 7 turns. The member 22 is inserted in the slot 14 and the recess 15 and it is fastened to the housing 10 by screws 23 and 24 that are inserted in screw holes 20ª and 21ª, respectively. The member 22 has arms 25 and 26 cast integral with its respective ends, to serve as supports for the armature 7, the arm 25 being provided with two screw holes 27 and 28 and the arm 26 with one screw hole 29.

In the screw hole 27 is inserted a screw 30 in which is wedged and centered a pivot pin 31 that coöperates with a bearing jewel 32. The bearing jewel is cemented to the armature 7 through a hole in a metal strip 33. The metal strip 33 is provided with laterally projecting arms 34 that are cemented to the armature 7. The pointer 8 is cemented to one end of the strip 33. In the hole 29 in the arm 26 is inserted a screw 35 that has a pivot pin 36 wedged and centered therein to coöperate with a bearing jewel 38 that is cemented to the armature 7 through a hole in a metal strip 37. The metal strip 37 is also cemented to the armature.

Springs 39 and 40 are employed, in accordance with the usual practice, to control the deflection of the movable element 7 and the resulting indication of the pointer so that they shall be proportional to the current of electricity flowing. The respective ends of the spring 39 are fastened to a stationary member 41 and to the armature 7, and the corresponding ends of the spring 40 are fastened to a stationary member 42 and to the armature.

The member 22 is used both as a support for the armature 7 and as a support for the magnetic core 9 about which the armature turns. The core 9 forms a path for the magnetic flux which passes through the armature from one pole piece to the other.

The bearing screws 30 and 35, having the steel pivot pins 31 and 36, respectively, are disposed in such a manner that they may be turned to conform to the spacing of the jewels or to release the armature element. The instrument members that are supported by the housing 10 may be removed by withdrawing the screws 23 and 24 and, after such removal, the armature 7 and its connected elements may be detached by loosening either the screw 30 or the screw 35.

The means for uniting the armature, the bearing jewels and the pointer insure a light, inexpensive and durable instrument but it must be understood that a cement which will not deteriorate with age and which will remain intact under all climatic conditions should be employed.

I do not limit my invention to any specific type of instrument, since it is equally applicable to the bearings of any lightweight moving elements, and the die-cast field poles are equally applicable to permanent or electro-magnets, of any form and adapted to any use.

I claim as my invention:

1. In an electrical measuring instrument, the combination with an armature and field-magnet pole pieces, of a non-magnetic housing disposed around all sides thereof except the sides adjacent the armature and the sides opposite thereto, a magnetizable core member having a non-magnetic supporting member on one side thereof, and means for removably attaching said supporting member to the housing.

2. In an electrical measuring instrument, the combination with an armature and accurately centered field-magnet pole pieces, of a non-magnetic housing disposed around all sides thereof except the sides adjacent the armature and the sides opposite thereto, a magnetizable core member, a supporting member secured to the core member, and a single means for centering the core member with respect to the field-magnet pole pieces.

3. In an electrical measuring instrument, the combination with an armature and accurately centered field-magnet pole pieces, of a non-magnetic housing disposed around all sides thereof except the sides adjacent the armature and the sides opposite thereto, and a magnetizable core member removably attached at one side to said housing.

4. In an electrical measuring instrument, the combination with an armature, pole pieces having concave surfaces adjacent the armature, and a permanent field magnet, of a housing disposed around all sides of the pole pieces except the concave surfaces and the sides opposite thereto, and means for removably securing the permanent magnet to the sides of the pole pieces opposite to the concave surfaces.

5. In an electrical measuring instrument, the combination with accurately centered field-magnet pole-pieces having substantially plane outer faces, and a permanent magnet operatively secured to the plane outer faces thereof, of a non-magnetic housing secured to all sides of said pole-pieces except the outer faces and the sides opposite thereto, a magnetizable core member, a supporting member secured to said core member, and means for centering the core member with respect to the pole-pieces.

6. In an electrical measuring instrument, the combination with accurately centered field-magnet pole-pieces severally having a substantially concave and a substantially plane opposite face, and a permanent magnet operatively secured to the plane faces thereof, of a non-magnetic housing secured around all sides of the pole-pieces except those having the concave and plane faces.

7. In an electrical measuring instrument, the combination with accurately centered field-magnet pole-pieces severally having a substantially concave and a substantially plane opposite face, and a permanent magnet operatively secured to the plane faces thereof, of a non-magnetic housing secured around all sides of the pole-pieces except those having the concave and the plane faces, a magnetizable core member, and means secured to the core member for supporting the same from the housing at a single point between the pole-pieces.

In testimony whereof, I have hereunto subscribed my name this 24th day of April 1913.

PAUL MacGAHAN.

Witnesses:
　Thos. S. Pukerud,
　B. B. Hines.